United States Patent [19]

Sterling et al.

[11] 4,158,170

[45] Jun. 12, 1979

[54] LINE CURRENT DETECTOR

[75] Inventors: Henley F. Sterling, Great Dunmow; Donald A. Weir, Goff's Oak, near Cheshunt; Rodger G. George; John V. Baxter, both of Bishops Stortford, all of England

[73] Assignee: International Standard Electric Corporation, New York, N.Y.

[21] Appl. No.: 814,608

[22] Filed: Jul. 11, 1977

[30] Foreign Application Priority Data

Jul. 20, 1976 [GB] United Kingdom ............... 30136/76

[51] Int. Cl.² ........................................... G01R 31/00
[52] U.S. Cl. ..................................................... 324/96
[58] Field of Search .................. 324/96, 133; 350/330; 179/18 HB

[56] References Cited

U.S. PATENT DOCUMENTS

| 3,346,811 | 10/1967 | Perry et al. | 324/96 |
| 3,590,374 | 6/1971 | Evans et al. | 324/96 |
| 3,662,263 | 5/1972 | Bensel | 324/96 |
| 3,941,939 | 3/1976 | Holmes et al. | 179/18 HB |
| 3,991,367 | 11/1976 | Chapman et al. | 324/96 X |
| 4,032,843 | 6/1977 | Loucks | 324/96 |

FOREIGN PATENT DOCUMENTS

| 2019934 | 11/1970 | Fed. Rep. of Germany | 324/96 |
| 1121423 | 7/1968 | United Kingdom | 324/96 |

Primary Examiner—Stanley T. Krawczewicz
Attorney, Agent, or Firm—James B. Raden; Marvin M. Chaban

[57] ABSTRACT

A line current detector for use in telecommunications systems to monitor line condition. The detector uses an optical or photo electric device whose input is modulated by line current. A photo transistor, electrically isolated from the line, senses the modulated output of the detector to produce a condition responsive output. The optical device is preferably a liquid crystal device. The output sensor is isolated from the line.

11 Claims, 4 Drawing Figures

LINE CURRENT DETECTOR

BACKGROUND OF THE INVENTION

In telephone systems of the types in use today, relay circuits are used to detect line condition to signal that condition to the exchange. The relay provides isolation between the input and output paths, as is well-known.

Optical couplers or isolators using light emitting diodes have become popular in the recent past for performing line current detection for the resultant signalling. For example, U.S. Pat. No. 3,941,939 issued Mar. 2, 1976 to P. Holmes et al. shows an optical coupler or isolator to sense line condition for ring trip control. Prior patents such as U.S. Pat. No. 3,748,401 issued July 24, 1973 to R. Pesz et al. and U.S. Pat. No. 3,865,992 issued Feb. 11, 1975 to L. Bouty et al. show this principle also for the line condition sensing for ring trip.

The use of liquid crystal devices to provide condition sensing by the use of optical means is shown by U.S. Pat. No. 3,718,381 issued Feb. 27, 1973 to G. Assouline et al., U.S. Pat. No. 3,627,408 issued Dec. 14, 1971 to Fergason, U.S. Pat. No. 3,837,730 issued Sept. 24, 1974 to W. Hatfield et al. and U.S. Pat. No. 3,920,996 issued Nov. 18, 1975 to Moore.

SUMMARY OF THE INVENTION

This invention relates to line-current detection and monitoring arrangements for use in automatic telecommunication exchanges.

In such an exchange, it is necessary to monitor the subscriber's line circuits so as to detect the initiation and termination of calls, and also to be able to detect dial pulses (where DC dialing is used) and ring trip. An arrangement for achieving such monitoring and detection should be relatively simple and should provide electrical isolation between the arrangement's inputs and outputs.

This invention has as its primary object the provision of an arrangement for monitoring subscriber's lines which provides electrical isolation.

According to the invention there is provided an electrical circuit arrangement for monitoring the current which flows in telecommunication subscriber's lines, which includes light source means serving said lines, a number of optical devices each of which is individual to one of said lines and each of which can have its impedance altered in a manner dependent on the light incident upon the optical device, connections from each said line to its one of said optical devices whereby the light transmissivity thereof can be altered in accordance with the electrical current conditions of that line, a detector associated with each said optical device so that changing current conditions in a subscriber's line are detected by that line's detector as a result of the light which reaches it via the line's optical device, and output connections associated respectively with said detectors.

In the preferred arrangements to be described herein the optical devices are liquid or solid crystal devices.

Embodiments of the invention will now be described with reference to the accompanying drawings.

Figure 1:
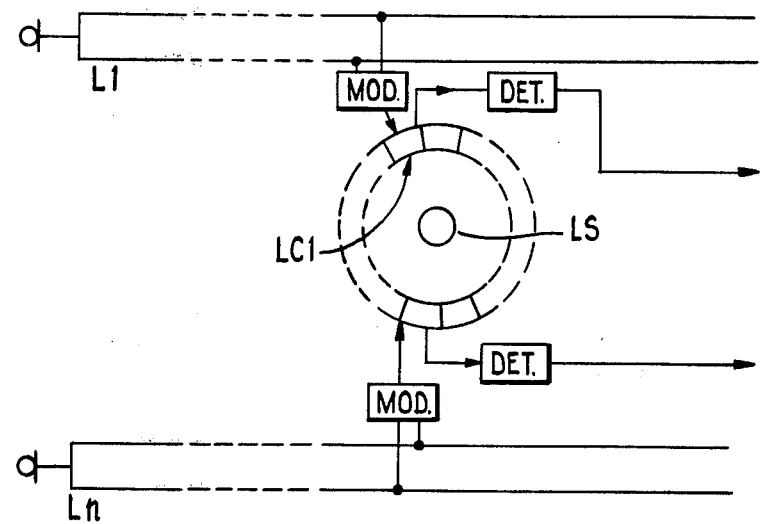
FIG. 1 is an arrangement for detecting changes in the line's state, looped or unlooped, including dial pulses in which the detection depends on changes in the opcaity of a liquid crystal medium.

DETAILED DESCRIPTION OF THE DRAWINGS:

In FIG. 1, a number of subscriber's lines L1 to Ln are shown, which are served by a set of liquid or solid crystal cells such as LC1 arranged in a ring and illuminated by a common light source LS. Immediately behind each cell, i.e. on the opposite side thereof from the light source LS, there is a detector DET, e.g. a phototransistor with associated output circuitry. Also associated with each cell there is a modulator MOD by which the line condition is allowed to influence the crystal cell's condition.

In the normal, i.e. unlooped, condition in which no current flows in the line the electrical conditions applied from the line via its modulator to its crystal cell are such as to render the cell opaque. Hence little or no light reaches the cell's detector. When the line is looped the current which flows therein causes the crystal cell to become light-transmissive, so that the detector responds and gives an output whose value is indicative of the looped state of the line. The line DC may be used to influence the crystal direct, or alternatively the influence may be exerted by the DC modulation of an AC source.

Figure 2:
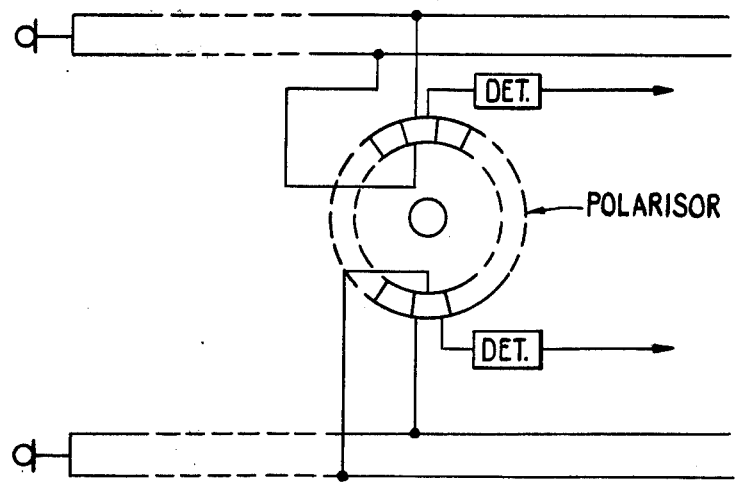
FIG. 2 is an arrangement which is generally similar to that of FIG. 1, but in which detection depends on changes in the medium's polarisation.

The arrangement of FIG. 2 is generally similar in concept to that of FIG. 1, except that the line current is caused to influence the polarisation condition of the liquid crystal medium. In this case the light source emits polarised light, so that once again, dependent on line current conditions, the response of the detector indicates whether the line is looped or unlooped. It is also possible for the characteristic of the crystal medium which is influenced to be its dynamic light-scattering ability. In this case the light source does not have to emit polarised light.

Note that the above arrangements will satisfactorily detect break impulses as sent by a conventional telephone dial since a break impulse looks to the detector like a short-term unlooped line condition.

Figure 3:
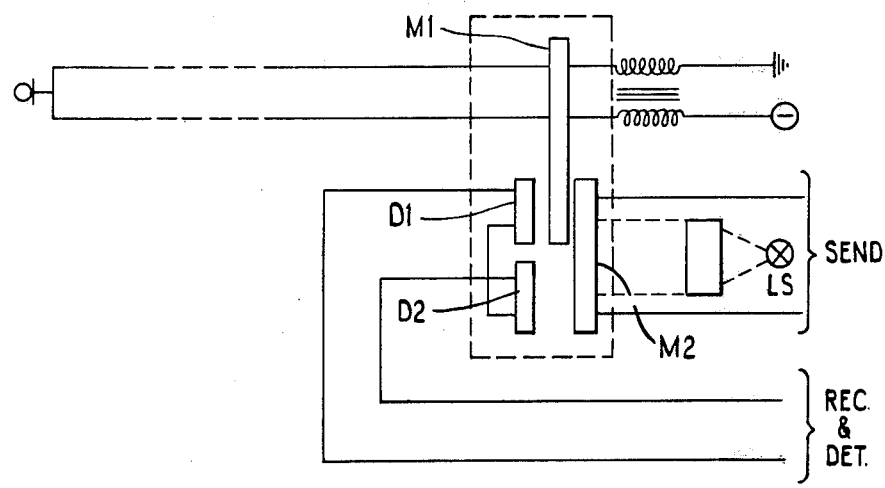
FIG. 3 shows an arrangement similar to FIG. 1, but which also provides two-wire/four-wire conversion.

The arrangement of FIG. 3 is suitable for use where a two-wire/four-wire conversion is needed: i.e. the arrangement for each line becomes an electro-optical hybrid. In this case the line current which influences the liquid crystal cells includes the speech currents. In this circuit the DC line feed is via chokes to a light modulator M1 so that the beam from the common light source LS is modulated in a manner appropriate to the line condition. Thus the line current which flows when the line is looped permits light at a constant level to fall on a detector D1, which causes a continuous current to flow in the receiving loop. This current is detected by the exchange's control circuitry as a line looped condition. Dialling with break impulses causes this current to be interrupted in a manner representative of what is dialled. When speech is received from the line the varying current modulates the light beam linearly, so that the speech is repeated over the receiving loop.

In the send direction signals are extracted before the circuitry shown is reached, and speech causes modulation of the light beam by a second crystal cell M2, and this modulated light falls on the crystal cell M1 and on the detectors D1 and D2. The cell M1 produces an EMF in series aiding such that a proportional change in line current occurs. The two detectors are connected in series opposition to effectively cancel any effect of send in the receive leg.

Figure 4:
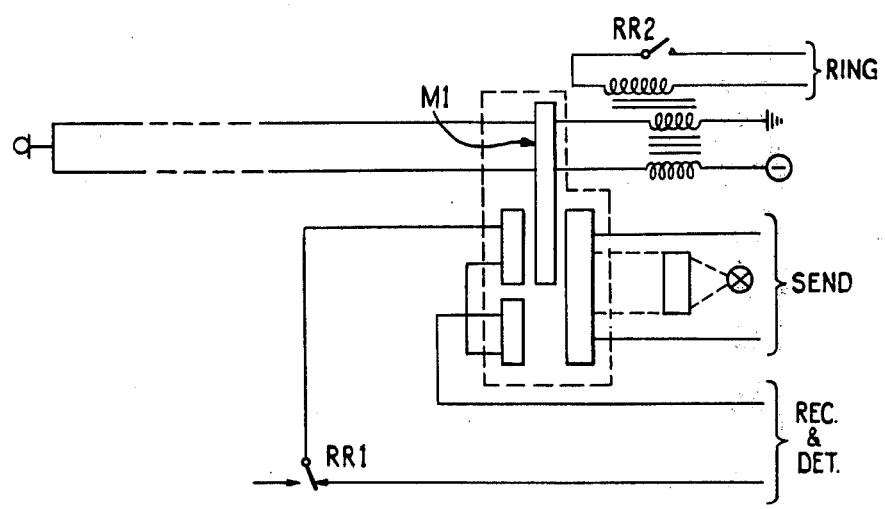
FIG. 4 is an arrangement similar to FIG. 3, but which caters for ringing.

An extension of the arrangement of FIG. 3, is shown in FIG. 4, which latter caters for ringing. When the ringing relay RR (not shown) operates, continuous ringing is applied to the line via a third choke winding, and at the same time the receive loop is disabled at RR1 so that the signal coupled via M1 does not reach the caller.

The main advantage of the above arrangement is that electronic equipment other than detectors associated with the line is completely isolated from the dangerous influences of high voltages and surges on the line, assuming that linear coupling is provided with bidirectional transmission. Various materials can be used as the modulating media, these including:

(a) lead zirconate titanate, possibly containing lithium,
(b) lithium niobate materials,
(c) lithium tantalate materials,
(d) barium strontium niobate,
(e) potassium dihydrogen phosphate,
(f) liquid crystals of the cholesteric or nematic form.

Dependent on the system, different materials will be used, the choice being influenced, inter alia, by impedance levels and power-carrying capabilities.

The optical devices used in the arrangements described herein are liquid crystal devices, but other optical devices can be used. Thus Kerr cells can also be used.

We claim:

1. An electrical circuit apparatus for monitoring current flowing in each of a plurality of telecommunication subscribers' lines, said apparatus including a common light source serving a group of said lines, a group of optical devices each of which is individual to one of said lines and each of which can have its impedance altered in a manner dependent on the amount of light incident upon the optical device with devices of a group illuminated by said light source, means connecting each said line to its individual optical device, and a modulator interposed between each line and its device whereby the condition of a device can be altered in accordance with the electrical current conditions of that line, a detector associated with each said optical device to detect changing current conditions in a subscriber's line as a result of the light which reaches it by way of the line's optical device, and output means coupled respectively to each of said detectors, and in which each said optical device is an electro-optic crystal cell, and in which said connecting means causes a low or zero light transmissivity from said cell when the line is not looped and a relatively high degree of light transmissivity when the line is looped.

2. An apparatus as claimed in claim 1, in which each said optical device is an electro-optic crystal device so arranged that the polarization condition of the medium of crystal device is influenced by the line current, and in which said light source is a source of polarised light, such that the cell passes light therefrom when the line is looped but not when it is unlooped.

3. An apparatus as claimed in claim 1, and in which each said optical device is an electro-optic crystal cell so arranged that the degree of dynamic light scattering in the crystal material is influenced by the line current such that the extent to which the cell passes light depends on the value of the light current.

4. An apparatus as claimed in claim 1, and in which each said detector is a photo transistor, 5. An apparatus as claimed in clam 1, in which the electro-optic crystal cells for a group of said lines are arranged in a circle, and in which the light source is a single light source located centrally of and serving all of said crystal cells.

6. An apparatus as claimed in claim 2, in which each said line is connected to influence said crystal cell which forms that line's optical device, in which the light source serving that line shines on a second crystal cell in addition to the first-mentioned crystal cell, with two cells positioned to physically overlap, in which two said detectors are provided one of which is influenced by light which has passed through both said cells in series and the other of which is influenced by light which has passed through only said second cell, and in which said detectors are connected in series opposition in a second two wire connection so that the arrangement forms an electro-optical analogue of a hybrid.

7. An apparatus as claimed in claim 6, in which there are chokes connected to a line's crystal cell and a transformer winding, and in which D.C. supply to that line is applied through said chokes, and ringing is applied to the line via a transformer winding associated with said chokes.

8. An apparatus as claimed in claim 1, and in which the crystal medium is selected from the group consisting of lead zirconate titanate, lithium niobate, vbarium strontium niobate and potassium dihydrogen phosphate.

9. An apparatus as claimed in claim 1, in which said crystal cell comprises a liquid crystal medium of cholesteric form.

10. An apparatus as claimed in claim 1, in which said crystall cell comprises a liquid crystal medium of nematic form.

11. An apparatus as claimed in claim 1, in which said crystal cell comprises a mixture of cholesteric and nematic liquid media.

* * * * *